US012689614B2

(12) United States Patent　　　　　　(10) Patent No.:　US 12,689,614 B2
Pabijanskas　　　　　　　　　　　　　(45) Date of Patent:　　Jul. 21, 2026

(54) OPTIMIZING COMMUNICATION IN A VIRTUAL PRIVATE NETWORK DURING BLOCKING OF AN EXIT INTERNET PROTOCOL ADDRESS

(71) Applicant: UAB 360 IT, Vilnius (LT)

(72) Inventor: Karolis Pabijanskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 684 days.

(21) Appl. No.: 17/960,781

(22) Filed: Oct. 5, 2022

(65) Prior Publication Data

US 2024/0114008 A1　　Apr. 4, 2024

Related U.S. Application Data

(63) Continuation of application No. 17/959,231, filed on Oct. 3, 2022, now Pat. No. 11,647,001.

(51) Int. Cl.
| | |
|---|---|
| *H04L 9/40* | (2022.01) |
| *H04L 12/46* | (2006.01) |
| *H04L 61/4511* | (2022.01) |
| *H04L 61/5007* | (2022.01) |
| *H04L 65/1069* | (2022.01) |

(52) U.S. Cl.
CPC ...... *H04L 63/0272* (2013.01); *H04L 12/4641* (2013.01); *H04L 61/4511* (2022.05); *H04L 61/5007* (2022.05); *H04L 63/0236* (2013.01); *H04L 65/1069* (2013.01)

(58) Field of Classification Search
CPC ............. H04L 63/0272; H04L 63/0236; H04L 61/5007; H04L 61/4511; H04L 12/4641; H04L 65/1069
See application file for complete search history.

(56) References Cited

U.S. PATENT DOCUMENTS

| | | | |
|---|---|---|---|
| 10,931,686 B1 | 2/2021 | Mehta et al. | |
| 11,310,146 B1 * | 4/2022 | Kaciulis | .............. H04L 63/0428 |
| 11,363,001 B1 | 6/2022 | Kolaitis et al. | |
| 11,368,428 B1 | 6/2022 | Pabijanskas et al. | |
| 11,425,099 B1 | 8/2022 | Warmenhoven | |
| 11,444,911 B1 * | 9/2022 | Baltrenas | ............ H04L 61/4511 |
| 11,503,056 B1 | 11/2022 | Cellesius | |

(Continued)

*Primary Examiner* — Scott B Christensen
*Assistant Examiner* — Zonghua Du
(74) *Attorney, Agent, or Firm* — The Pattani Law Group

(57)　　　　　　ABSTRACT
A method including configuring a VPN server to assign, based on establishing a VPN connection, a first exit IP address to be utilized for retrieving information during the VPN connection; configuring the VPN server to determine, during the established VPN connection, a host device that is likely to block communication from the first exit IP address; configuring the VPN server to modify associated DNS settings to return communication information associated with the VPN server itself when the information is to be retrieved from the host device; configuring the VPN server to receive, during the established VPN connection, the information retrieved from the host device based on utilizing a second exit IP address associated with a secondary server; and configuring the VPN server to transmit, during the established VPN connection, the information to a user device in accordance with the modified DNS settings is disclosed. Various other aspects are contemplated.

20 Claims, 7 Drawing Sheets

(56)                 References Cited

U.S. PATENT DOCUMENTS

2012/0030751 A1*    2/2012    Datta ..................... H04L 63/164
                                                              726/15
2013/0332986 A1*   12/2013    Sima ....................... H04L 63/20
                                                               726/1
2016/0197933 A1*    7/2016    Lapidous ................ H04L 67/02
                                                              726/26
2016/0248728 A1*    8/2016    Evans ................. H04L 61/4511
2016/0308819 A1*   10/2016    Gupta ................. H04L 61/4511
2019/0068554 A1*    2/2019    Austin .................. H04L 63/101
2019/0306111 A1*   10/2019    Tang ................... H04L 43/0864
2020/0236048 A1*    7/2020    Branch .............. H04L 12/4633
2021/0319527 A1    10/2021    Benkreira et al.
2023/0006972 A1*    1/2023    Kolaitis ............. H04L 61/5061
2023/0396581 A1*   12/2023    Baltrenas ........... H04L 12/4641

* cited by examiner

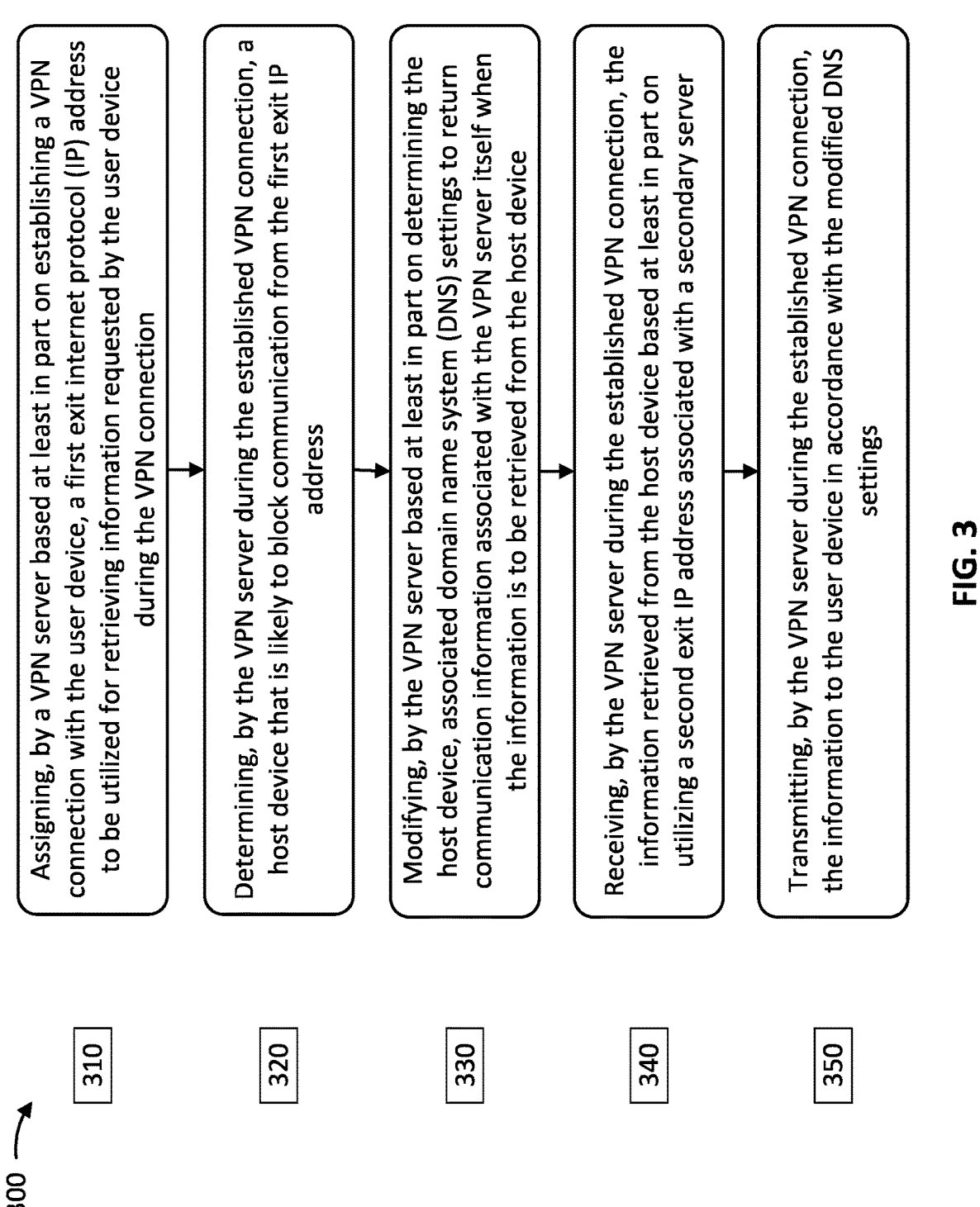

300

310 Assigning, by a VPN server based at least in part on establishing a VPN connection with the user device, a first exit internet protocol (IP) address to be utilized for retrieving information requested by the user device during the VPN connection 320 Determining, by the VPN server during the established VPN connection, a host device that is likely to block communication from the first exit IP address 330 Modifying, by the VPN server based at least in part on determining the host device, associated domain name system (DNS) settings to return communication information associated with the VPN server itself when the information is to be retrieved from the host device 340 Receiving, by the VPN server during the established VPN connection, the information retrieved from the host device based at least in part on utilizing a second exit IP address associated with a secondary server 350 Transmitting, by the VPN server during the established VPN connection, the information to the user device in accordance with the modified DNS settings

FIG. 3

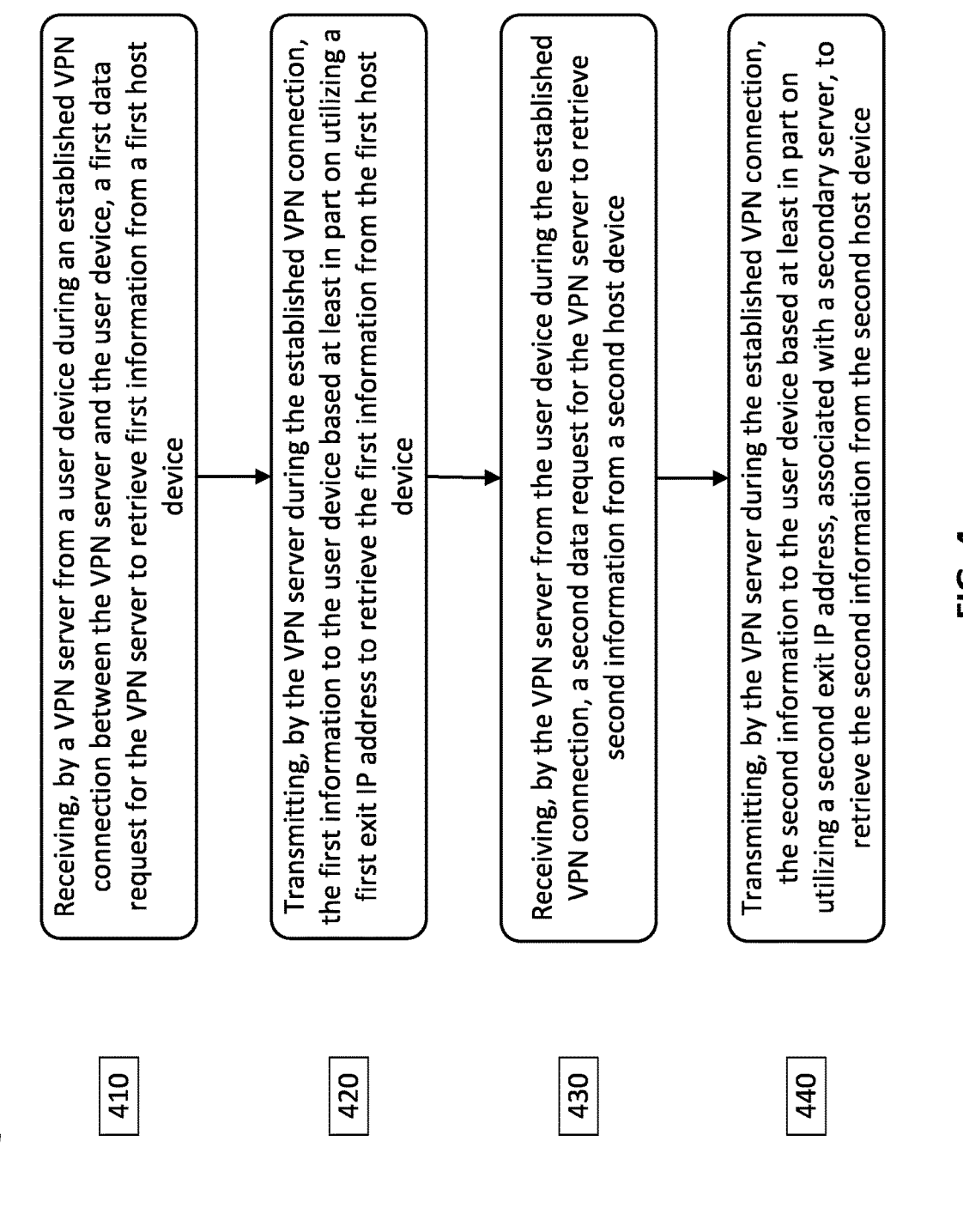

400

410 Receiving, by a VPN server from a user device during an established VPN connection between the VPN server and the user device, a first data request for the VPN server to retrieve first information from a first host device 420 Transmitting, by the VPN server during the established VPN connection, the first information to the user device based at least in part on utilizing a first exit IP address to retrieve the first information from the first host device 430 Receiving, by the VPN server from the user device during the established VPN connection, a second data request for the VPN server to retrieve second information from a second host device 440 Transmitting, by the VPN server during the established VPN connection, the second information to the user device based at least in part on utilizing a second exit IP address, associated with a secondary server, to retrieve the second information from the second host device

FIG. 4

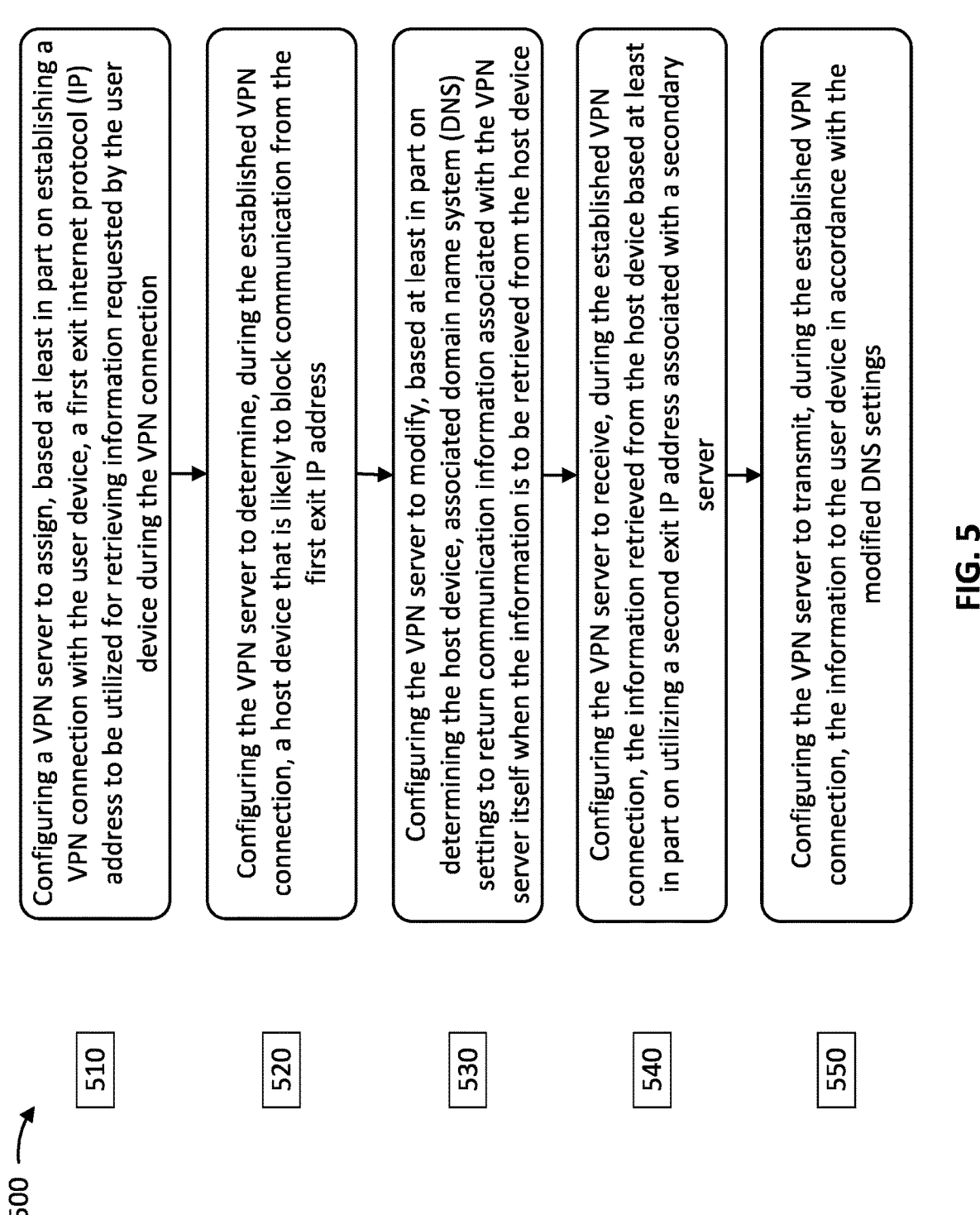

500

510 — Configuring a VPN server to assign, based at least in part on establishing a VPN connection with the user device, a first exit internet protocol (IP) address to be utilized for retrieving information requested by the user device during the VPN connection 520 — Configuring the VPN server to determine, during the established VPN connection, a host device that is likely to block communication from the first exit IP address 530 — Configuring the VPN server to modify, based at least in part on determining the host device, associated domain name system (DNS) settings to return communication information associated with the VPN server itself when the information is to be retrieved from the host device 540 — Configuring the VPN server to receive, during the established VPN connection, the information retrieved from the host device based at least in part on utilizing a second exit IP address associated with a secondary server 550 — Configuring the VPN server to transmit, during the established VPN connection, the information to the user device in accordance with the modified DNS settings

FIG. 5

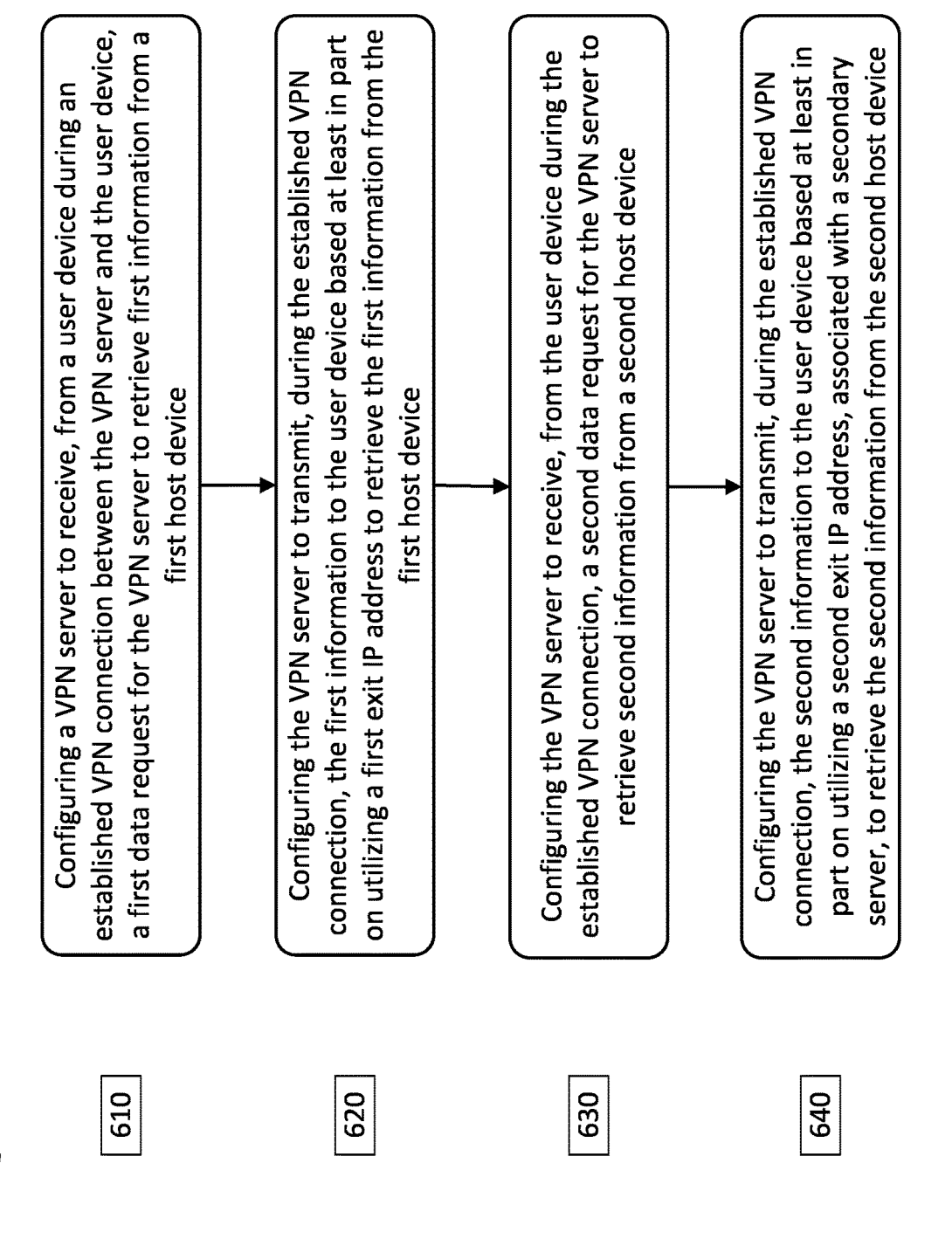

610　Configuring a VPN server to receive, from a user device during an established VPN connection between the VPN server and the user device, a first data request for the VPN server to retrieve first information from a first host device 620　Configuring the VPN server to transmit, during the established VPN connection, the first information to the user device based at least in part on utilizing a first exit IP address to retrieve the first information from the first host device 630　Configuring the VPN server to receive, from the user device during the established VPN connection, a second data request for the VPN server to retrieve second information from a second host device 640　Configuring the VPN server to transmit, during the established VPN connection, the second information to the user device based at least in part on utilizing a second exit IP address, associated with a secondary server, to retrieve the second information from the second host device

OPTIMIZING COMMUNICATION IN A VIRTUAL PRIVATE NETWORK DURING BLOCKING OF AN EXIT INTERNET PROTOCOL ADDRESS

CROSS REFERENCE

This application is a continuation of U.S. Non-Provisional patent application Ser. No. 17/959,231, filed on Oct. 3, 2022, and titled "Optimizing Communication In A Virtual Private Network During Blocking Of An Exit Internet Protocol Address," the entire contents of which are incorporated herein by reference.

FIELD OF DISCLOSURE

Aspects of the present disclosure generally relate to a virtual private network (VPN), and more particularly to optimizing communication in a VPN environment during blocking of an exit internet protocol (IP) address.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded/encrypted, unreadable format with help of an encryption algorithm. Decryption may be associated with changing the data from being in the encoded/encrypted, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target (e.g., via the Internet). Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the better (e.g., stronger) is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, Wireguard, and IKEv2.

SUMMARY

In one aspect, the present disclosure contemplates a method including assigning, by a VPN server based at least in part on establishing a VPN connection with the user device, a first exit internet protocol (IP) address to be utilized for retrieving information requested by the user device during the VPN connection; determining, by the VPN server during the established VPN connection, a host device that is likely to block communication from the first exit IP address; modifying, by the VPN server based at least in part on determining the host device, associated domain name system (DNS) settings to return communication information associated with the VPN server itself when the information is to be retrieved from the host device; receiving, by the VPN server during the established VPN connection, the information retrieved from the host device based at least in part on utilizing a second exit IP address associated with a secondary server; and transmitting, by the VPN server during the established VPN connection, the information to the user device in accordance with the modified DNS settings.

In another aspect, the present disclosure contemplates a device associated with a virtual private network (VPN), the device comprising a memory; and a processor communicatively coupled to the memory, the processor being configured to: assign, based at least in part on establishing a VPN connection with the user device, a first exit internet protocol (IP) address to be utilized for retrieving information requested by the user device during the VPN connection; determine, during the established VPN connection, a host device that is likely to block communication from the first exit IP address, based at least in part on determining the host device, associated domain name system (DNS) settings to return communication information associated with the VPN server itself when the information is to be retrieved from the host device; receive, during the established VPN connection, the information retrieved from the host device based at least in part on utilizing a second exit IP address associated with a secondary server; and transmitting, during the established VPN connection, the information to the user device in accordance with the modified DNS settings.

In another aspect, the present disclosure contemplates a non-transitory computer readable medium storing instructions, which when executed by a processor configure the processor to: assign, based at least in part on establishing a VPN connection with the user device, a first exit internet protocol (IP) address to be utilized for retrieving information requested by the user device during the VPN connection; determine, during the established VPN connection, a host device that is likely to block communication from the first exit IP address; modify, based at least in part on determining the host device, associated domain name system (DNS) settings to return communication information associated with the VPN server itself when the information is to be retrieved from the host device; receive, during the established VPN connection, the information retrieved from the host device based at least in part on utilizing a second exit IP address associated with a secondary server; and transmitting, during the established VPN connection, the information to the user device in accordance with the modified DNS settings.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
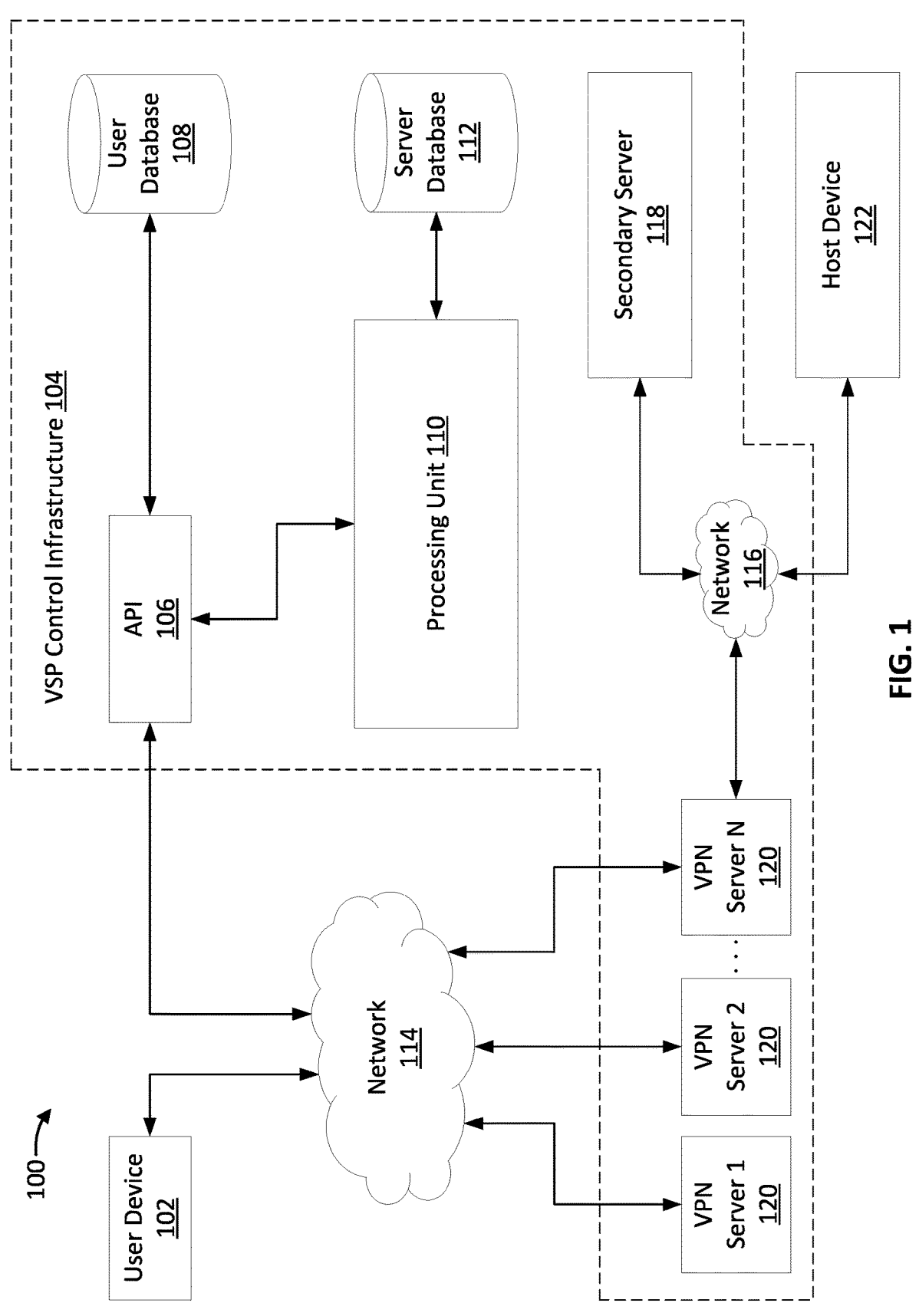

FIG. 1 is an illustration of an example system associated with optimizing communication in a VPN environment during blocking of an exit IP address, according to various aspects of the present disclosure.

Figure 2:
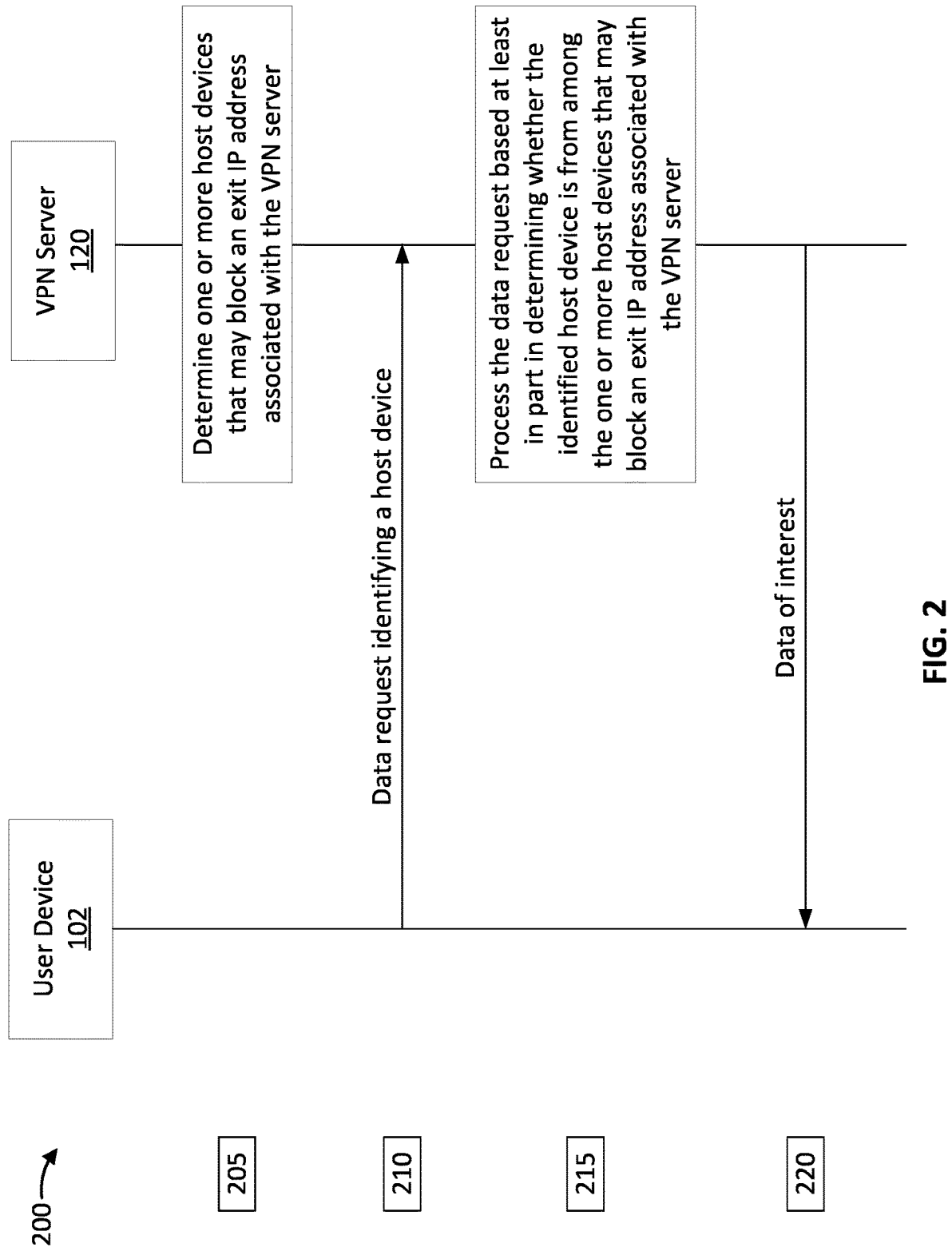

FIG. 2 is an illustration of an example flow associated with optimizing communication in a VPN environment during blocking of an exit IP address, according to various aspects of the present disclosure.

FIG. 3 is an illustration of an example process associated with optimizing communication in a VPN environment during blocking of an exit IP address, according to various aspects of the present disclosure.

FIG. 4 is an illustration of an example process associated with optimizing communication in a VPN environment during blocking of an exit IP address, according to various aspects of the present disclosure.

FIG. 5 is an illustration of an example process associated with optimizing communication in a VPN environment during blocking of an exit IP address, according to various aspects of the present disclosure.

FIG. 6 is an illustration of an example process associated with optimizing communication in a VPN environment during blocking of an exit IP address, according to various aspects of the present disclosure.

Figure 7:
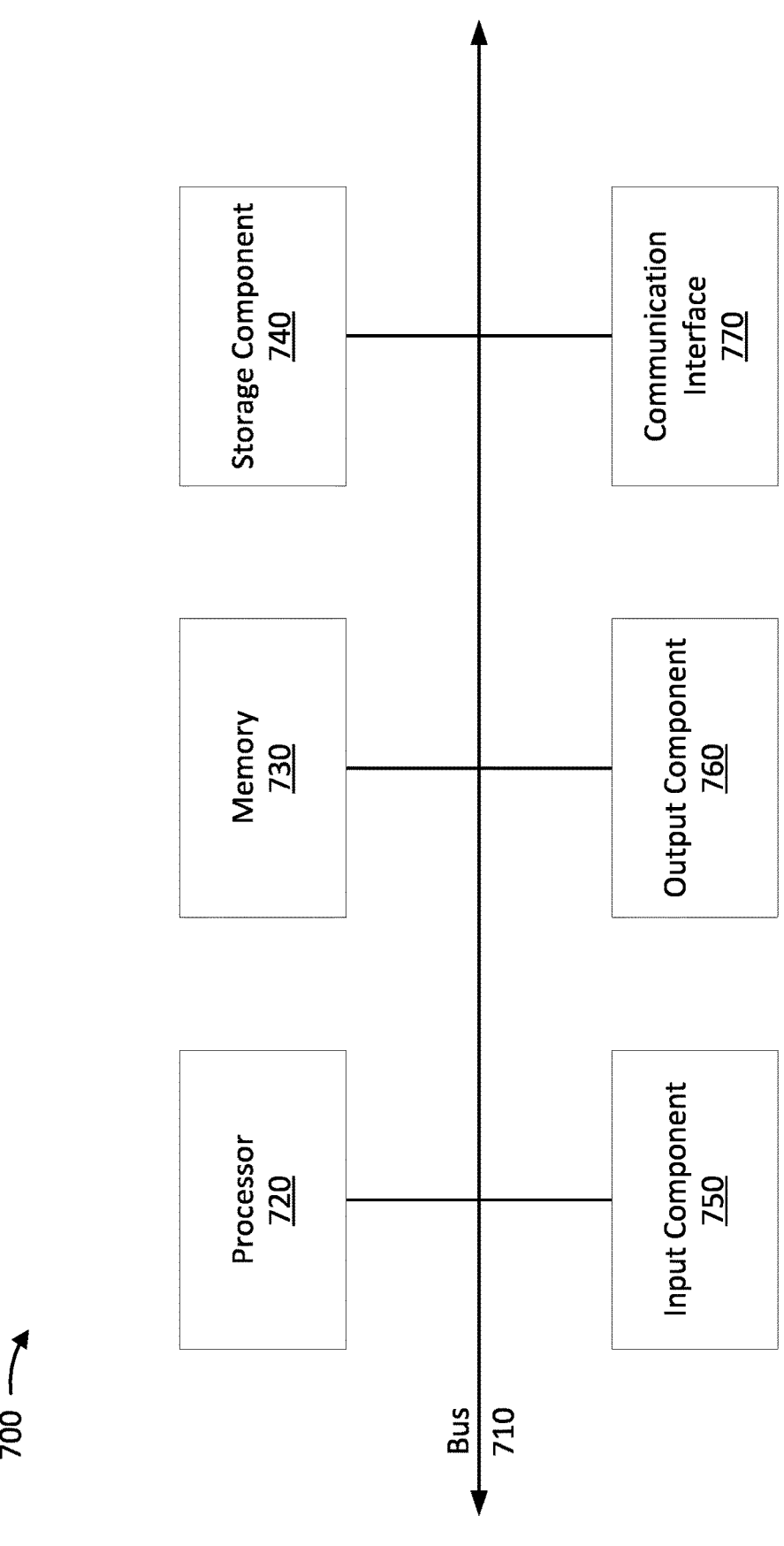

FIG. 7 is an illustration of example devices associated with optimizing communication in a VPN environment during blocking of an exit IP address, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with optimizing communication in a VPN environment during blocking of an exit IP address, according to various aspects of the present disclosure. Example 100 shows an architectural depiction of components included in system 100. In some aspects, the components may include a user device 102 capable of communicating with a VPN service provider (VSP) control infrastructure 104 and with one or more VPN servers 120 over a network 114. The VSP control infrastructure 104 may be controlled by a VPN service provider and may include an application programming interface (API) 106, a user database 108, processing unit 110, a server database 112, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 114. The processing unit 110 may be capable of configuring and controlling operation of the one or more VPN servers 120. The VPN servers 120 may be configured to communicate with one or more host devices 122 over a network 116 to, for example, request and retrieve data of interest. Further, as shown in FIG. 1, the VPN servers 120 may be configured to communicate with one or more secondary servers 118 for routing of requests for data of interest received from the user device 102. The VPN servers 120 may also be configured to communicate with an authentication server (not shown) over the network. The processing unit 110 may be capable of configuring and controlling operation of the authentication server. In some aspects, the network 116 may be similar to network 114.

The user device 102 may be a physical computing device capable of hosting a VPN application and of connecting to the network 114. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like.

The network 114 and/or the network 116 may be any digital telecommunication network that permits several nodes to share and access resources. In some aspects, the network 114 and/or the network 116 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 114, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add, delete, and/or modify such valid unique combinations of user IDs and passwords from the structured repository. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may enable the user device 102 to obtain VPN services. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal VPN server. In some implementations, the processing unit 110 may be configured to determine/identify a list of VPN servers. The processing unit 110 may utilize the API 106 to transmit the IP address of the optimal VPN server or IP addresses of the VPN servers 120 is provided, the user device 102 may have an option to select a single VPN server 120 from among the listed VPN servers as the optimal VPN server.

In some aspects, the processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120. In some aspects, based at least in part on server penalty scores calculated utilizing the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

The user device 102 may transmit to the optimal VPN server an initiation request to establish a VPN connection (e.g., an encrypted tunnel) with the optimal VPN server. The optimal VPN server with which the user device establishes the encrypted tunnel may be referred to as a primary VPN server or an entry VPN server. Based at least in part on receiving the initiation request, the optimal VPN server may conduct a VPN authentication with the authentication server to authenticate the user device 102 as a device that may receive the VPN services from the optimal VPN server. When the VPN authentication is successful, the optimal VPN server may proceed to provide the VPN services to the user device 102. Alternatively, when the VPN authentication fails, the optimal VPN server may refrain from providing the VPN services to the user device 102 and/or may communicate with the user device 102 to obtain additional information to authenticate the user device 102.

In some aspects, a VPN server 120 may include a piece of physical or virtual computer hardware and/or software capable of securely communicating with (the VPN application on) the user device 102 for provision of VPN services. Similarly, the authentication server may include a piece of physical or virtual computer hardware and/or software capable of securely communicating with one or more VPN servers 120 for provision of authentication services.

The one or more host devices 122 may include a type of server that hosts or houses websites and/or related data, applications, and/or services. The one or more host devices 122 may be a remotely accessible Internet server with complete Web server functionality and resources. In some aspects, the one or more host devices 122 may be referred to as a Web hosting server.

In some aspects, the one or more secondary servers 118 may include one or more VPN servers 120. In some aspects, the one or more secondary servers 118 may include one or more servers configured and/or programmed with available exit IP addresses. The one or more secondary servers may include a processor communicatively coupled with, among other things, a volatile memory, a non-volatile memory, and a communication interface to enable a network connection. Further, the one or more secondary servers 118 may be configured and/or programmed to enable secure connections involving encryption and decryption of data.

One or more components (e.g., API 106, user database 108, processing unit 110, server database 112, secondary server 118, VPN server 120, and/or host device 122) included in the VSP control infrastructure 104 and/or components (e.g., processing unit, memory, communication interface, etc.) included in the user device 102 may further be associated with a controller/processor, a memory, a communication interface, or a combination thereof (e.g., FIG. 7). For instance, the one or more components may include or may be included in a controller/processor, a memory, or a combination thereof. In some aspects, the one or more components may be separate and distinct from each other. Alternatively, in some aspects, one or more components may be combined with another one of the one or more components. In some aspects, the one or more components may be local with respect to each other. Alternatively, in some aspects, the one or more components may be located remotely with respect to another one of the one or more components. Additionally, or alternatively, the one or more components may be implemented at least in part as software stored in a memory. For example, a component (or a portion of a component) may be implemented as instructions or code stored in a non-transitory computer-readable medium and executable by a hardware controller or a hardware processor to perform the functions or operations of the component. Additionally, or alternatively, the one or more components may be configured to perform one or more functions described as being performed by another one of the one or more components.

As indicated above, FIG. 1 is provided as an example. Other examples may differ from what is described with regard to FIG. 1.

A user device may seek to obtain VPN services from a VSP control infrastructure. Based at least in part on authentication of the user device, the VSP control infrastructure may select a VPN server to provide the VPN services to the user device. In an example, the VSP control infrastructure may provide the user device with an entry IP address associated with the VPN server. The user device may utilize the entry IP address to communicate and establish a VPN connection (e.g., encrypted tunnel) with the VPN server. Based at least in part on the VPN connection being established, the VSP control infrastructure and/or the VPN server may assign an exit IP address to the user device.

During the established VPN connection (e.g., while the given VPN connection remains established), the VPN server may utilize the entry IP address and the assigned exit IP address to process requests received from the user device. For instance, during the established VPN connection, the VPN server may utilize the entry IP address to receive a request from the user device for retrieving data of interest from a host device and may utilize the exit IP address to retrieve the data of interest from the host device. Utilizing the exit IP address may include the VPN server utilizing the exit IP address to communicate (e.g., transmit and/or receive communications) with the host device to retrieve the data of interest. Further, the VPN server may utilize a correlation between the exit IP address and the entry IP address to transmit the retrieved data of interest to the user device.

In some cases, the host device may examine the exit IP address and determine that the exit IP address is an IP address associated with a commercial entity (e.g., the VPN server). For instance, the host device may determine that the exit IP address is an IP address assigned for commercial use by the commercial entity. In an example, the host device may determine that the exit IP address is being utilized to mask information (e.g., an identity) regarding the user device, thereby purposefully hiding such information from the host device. As a result, the host device may decline to provide the data of interest requested via utilization of the exit IP address. Further, the host device may temporarily or permanently discard all communication received via utilization of the exit IP address. In this case, the VPN server may be unable to retrieve data of interest from the host device for any user device.

When the host device declines to provide the data of interest during the established VPN connection, the VPN server may determine that the assigned exit IP address is blocked and may utilize a new exit IP address, associated with a secondary server, to request and receive the data of interest from the host device. To associate with the secondary server, the VPN server may configure domain name system (DNS) settings to resolve for communication information (e.g., IP address) associated with the secondary server itself instead of resolving for communication information associated with the host device. In this case, the primary server (e.g., VPN server) may route the data request for the data interest to the host device via the secondary server. The secondary server may utilize the new exit IP address to retrieve the data of interest from the host device and transmit the retrieved data of interest to the primary VPN server, which, in turn, may forward (e.g., transmit) the received data of interest to the user device over the established VPN connection.

Because the DNS settings are configured to resolve for the secondary server, a web application (e.g., web browser, client application, etc.) installed on the user device may receive communication information (e.g., IP address) associated with the secondary server. Such communication information may be stored in a cache memory associated with the web application for a given time period. During this time period, the user device may be unable to receive data of interest retrieved by and received from another secondary server. For instance, if the secondary server becomes unavailable (e.g., power outage, loss of network, etc.), the VPN server may be unable to forward to the user device any data of interest retrieved by utilizing the other secondary server until an expiration of the time period (e.g., deletion or refreshing of the communication information). As a result, although the established VPN connection (e.g., encrypted tunnel) is maintained between the user device and the VPN server, the VPN server may be unable to forward data of interest over the established VPN connection to the user device for the given time period.

Maintaining the established VPN connection until the expiration of the time period, without being able to forward the data of interest, may inefficiently consume user device resources (e.g., processing resources, memory resources, power consumption resources, battery life, or the like) and VPN resources (computational resources, network bandwidth, management resources, processing resources, memory resources, or the like) that may otherwise be used to perform suitable tasks associated with the VPN. Additionally, to receive the data interest from the host device, the user device may terminate the established VPN connection prior to the expiration of the time period and establish a new VPN connection with a new VPN server to again request the data of interest. Terminating the established VPN connection, establishing the new VPN connection with the new VPN server, and again requesting the data interest utilizing the new exit IP address may also inefficiently consume user device resources and VPN resources that may otherwise be used to perform suitable tasks associated with the VPN.

Various aspects of systems and techniques discussed in the present disclosure enable optimizing communication in a VPN environment during blocking of an exit IP address. In some aspects, a user device may establish a VPN connection (e.g., encrypted tunnel) with a primary server (e.g. VPN server) configured by a VSP control infrastructure to provide VPN services to the user device. Based at least in part on establishing the VPN connection, the primary server may determine one or more host devices that may block communication from exit IP addresses (e.g., block exit IP addresses) assigned to the user device by the primary server. With respect to such one or more host devices, the primary server may configure associated domain name system (DNS) settings to resolve for communication information (e.g., IP address) associated with the primary server itself instead of resolving for (i) communication information associated with the one or more host devices or (ii) communication information associated with a secondary server (e.g., another VPN server, relay server, etc.). When a data request to retrieve data of interest from the one or more host devices is received, and communication from an assigned exit IP address is blocked, the primary server may utilize an unblocked new exit IP address associated with a secondary server to retrieve the data of interest from the one or more host devices. In this case, the secondary server may utilize the new exit IP address to retrieve the data of interest from the one or more host devices and transmit the retrieved data of interest to the primary server, which, in turn, may forward (e.g., transmit) the received data of interest to the user device over the established VPN connection. Because the DNS settings are configured to resolve for the primary server itself, a web application (e.g., web browser, client application, etc.) installed on the user device may receive communication information associated with the primary server instead of communication information associated with the secondary server. The communication information associated with the primary server may be stored in a cache memory of the user device for a given time period. As such, even when the secondary server becomes unavailable, and the primary server utilizes another secondary server to retrieve the data of interest from the one or more host devices, the information stored in a cache of the web application is that of the primary server. As a result, the primary server (e.g., VPN server) may be able to forward, in real time (e.g., without having to wait for an expiration of the given time period), data of interest retrieved by the other secondary server to the user device over the established VPN connection, thereby optimizing communication in the VPN. In this way, the VSP control infrastructure and/or the primary server may enable the user device to receive the data of interest without, among other things, maintaining the established VPN connection without being able to receive data of interest, and/or disconnecting the established VPN connection, and/or establishing the new VPN connection with the new VPN server, and/or requesting the data of interest utilizing the new exit IP address associated with the new VPN server. As a result, the VSP control infrastructure and/or the primary server may enable efficient utilization of user device resources (e.g., processing resources, memory resources, power consumption resources, battery life, or the like) and VPN resources (computational resources, network bandwidth, management resources, processing resources, memory resources, or the like) for performing suitable tasks associated with the VPN.

In some aspects, a processor (e.g., processor 720) associated with the VPN server may assign, based at least in part on establishing a VPN connection with the user device, a first exit internet protocol (IP) address to be utilized for retrieving information requested by the user device during the VPN connection; determine, during the established VPN connection, a host device that is likely to block communication from the first exit IP address; modify, based at least in part on determining the host device, associated domain name system (DNS) settings to return communication information associated with the VPN server itself when the information is to be retrieved from the host device; receive, during the established VPN connection, the information retrieved from the host device based at least in part on utilizing a second exit IP address associated with a secondary server; and transmitting, during the established VPN connection, the information to the user device in accordance with the modified DNS settings. In some aspects, the VPN server 120 may proactively, and prior to receiving a data request from the user device 102, utilize the assigned exit IP address to transmit periodic queries to determine whether the host device has blocked communication from the exit IP address. When the VPN server 120 determines that the host device has blocked communication from the assigned exit IP address, the VPN server 120 may determine that another exit IP address is to be utilized to retrieve data of interest from the host device.

Utilizing an exit IP address by a server (e.g., primary server, secondary server, etc.) may be associated with the server selecting and/or assigning the exit IP address to a user device during an established VPN connection between the user device and the primary server. The exit IP addresses may be selected from a pool of exit IP addresses available to the server. In some aspects, a first exit IP address may be assigned to a user device to process a first data request received from the user device. Based at least in part on determining that communication from the first exit IP address is blocked, the VPN server may assign a new exit IP address (e.g., second exit IP address) to the user device to process the first data request. In some aspects, processing a data request may involve requesting and retrieving data of interest associated with or requested via the data request. In some aspects, the new exit IP address may be associated with a different server.

FIG. 2 is an illustration of an example flow 200 associated with optimizing communication in a VPN environment during blocking of an exit IP address, according to various aspects of the present disclosure. Example flow 200 includes a user device 102 in communication with a VPN server 120. In some aspects, the user device 102 may communicate with the VPN server 120 over a network (e.g., network 114). In some aspects, the VPN server 120 may be a primary server.

The user device 102 may be in communication with the VPN server 120 based at least in part on utilizing an entry IP address to establish a VPN connection with the VPN server 120. In some aspects, the established VPN connection may use a VPN protocol such as, for example, Wireguard, IKEv2, OpenVPN, or the like. Based at least in part on establishing the VPN connection, the VPN server 120 may assign an exit IP address (e.g., first exit IP address) to the user device 102. In some aspects, the exit IP address may be selected from among a plurality of exit IP addresses included in a pool of exit IP addresses available to the VPN server 120.

In some aspects, the exit IP address may be randomly selected or sequentially selected from among the plurality of exit IP addresses included in the pool of exit IP addresses. Randomly selecting or sequentially selecting an exit IP address may include selecting an exit IP address according to, for example, an inverse sequential order, a random sequential (random but higher) order, a random inverse (random but lower) order, a random non-sequential (random but not next) order, a two-step (random and then next) order, a random including current exit IP address order, a sequential discreet (at least n+2 steps, with n being an integer), and/or a random lower bound (random but only within a upper half, upper quartile, etc.) order.

In some aspects, the VPN server 120 may utilize an nftable network filter to assign exit IP addresses. In some aspects, the VSP control infrastructure 104 (e.g., processing unit 110) may program the nftables with respect to assigning of exit IP addresses. For instance, the VSP control infrastructure 104 may configure the VPN server to select and/or assign exit IP addresses randomly or to select and/or assign exit IP addresses sequentially. Based at least in part on assigning the exit IP address to the user device 102, the VPN server 120 may store an correlation between the entry IP address and the exit IP address (that is assigned to the user device 102) in a connection tracking table.

Based at least in part on the VPN connection being established, as shown by reference numeral 205, the VPN server 120 may determine one or more host devices that may block communication from an exit IP address (e.g., decline to provide data of interest requested utilizing an exit IP address, etc.) associated with the VPN server 120. In other words, the VPN server 120 may determine one or more host devices that may block the VPN server 120 from utilizing an exit IP address to communicate with the one or more host devices. In some aspects, the VPN server 120 may determine one or more host devices based at least in part on the VPN server 120 compiling and maintaining, in an associated memory, a list of domain names and/or IP addresses (e.g., stored host device information) associated with host devices believed to block communication from exit IP addresses (also referred to as blocking exit IP addresses) assigned for commercial use by a commercial entity. In some aspects, the VPN server 120 may compile the list of such domain names and/or IP addresses based at least in part on a domain name and/or IP address associated with a host device that has previously blocked communication from an exit IP address associated with the VPN server 120, publicly available lists of such domain names and/or IP addresses, purchasing lists of such domain names and/or IP addresses, crawling the open Internet to discover such domain names and/or IP addresses, data (e.g., survey data, complaints, feedback, or the like) provided by user devices receiving VPN services from VPN servers, or the like.

Based at least in part on determining the one or more host devices, the VPN server 120 may modify a configuration file and/or a configuration database related to a domain name system (DNS) server included in and/or associated with the VPN server 120. In some aspects, the modification to the configuration file and/or the configuration database may include a correlation between the one or more host devices and the VPN server 120 itself. In an example, the VPN server 120 may modify the configuration file and/or the configuration database such that, when the VPN server 120 receives a data request for retrieving data of interest from the one or more host devices that are likely to block communication from exit IP addresses associated with the VPN server 120, the DNS server returns the communication information (e.g., domain name, IP address, etc.) associated with the VPN server 120 itself rather than communication information associated with the host device or communication information associated with a secondary server.

During the established VPN connection, the VPN server 120 may receive a plurality of data requests from the user device 102. For instance, as shown by reference numeral 210, the user device 102 may utilize the entry IP address to transmit a data request to the VPN server 120. In some aspects, the data request may include a request for the VPN server 120 to retrieve and provide data of interest to the user device 102. In one example, the user device may transmit the data request by utilizing a client application configured and provided by the VSP control infrastructure or a browser installed on the user device 102. The data request may be associated with initiating a connection with a website on the Internet, and may request the VPN server 120 to retrieve and provide data of interest from a host device that is hosting the website.

In some aspects, the data of interest may identify communication information (e.g., received host device information), such as domain name, IP address, or a combination thereof, associated with the host device (e.g., identified host device) from whom the data of interest is to be retrieved. For instance, the data request may identify the data of interest to be retrieved and/or the communication information associated with the identified host device indicating that the data of interest is to be retrieved from the identified host device. In some aspects, the data request may include an unsecure IP packet. In this case, user device 102 may include the communication information in a request line included in the unsecure IP packet. The data of interest may be identified in a payload of the unsecure IP packet. In some aspects, the data request may include a secure IP packet. In this case, the user device 102 may configure the secure IP packet to include a server name indication (SNI) header, and may include the communication information within the SNI header. The data of interest may be identified in a payload of the secure IP packet.

Based at least in part on receiving the data request, the VPN server 120 may inspect the IP packet included in the data request. In some aspects, the VPN server 120 may analyze the payload of the IP packet to determine the data of interest to be retrieved. In some aspects, the VPN server 120 may determine whether the message includes the unsecure IP packet or a secure IP packet. When the VPN server 120 determines that the message includes an unsecure IP packet, the VPN server 120 may analyze the request line to determine the communication information associated with the identified host device. Alternatively, when the VPN server 120 determines that the message includes a secure IP packet, the VPN server 120 may analyze the SNI header to determine the communication information associated with the identified host device.

Based at least in part on receiving the data request, the VPN server 120 may determine whether the identified host device is from among the one or more host devices that may block communication from an exit IP address associated with the VPN server 120. In an example, the VPN server 120 may compare the received host device information included in the data request with the stored host device information maintained in the associated memory. When the received host device information fails to match (e.g., is different from) the stored host device information, the VPN server 120 may determine that the identified host device is not likely to block communication from an exit IP address associated with the VPN server 120. Alternatively, when the received host device information matches (e.g., is the same as) at least a portion of the stored host device information, the VPN server 120 may determine that the identified host device is likely to block communication from an exit IP address associated with the VPN server 120.

As shown by reference numeral 215, the VPN server 120 may process the data request based at least in part in determining whether the identified host device is from among the one or more host devices that may block communication from an exit IP address associated with the VPN server. In one example, when the VPN server 120 determines that the identified host device is not likely to block communication from an exit IP address associated with the VPN server 120, the VPN server 120 may process the data request using the assigned exit IP address. Because the identified host device is not from among the one or more host devices that may block communication from an exit IP address associated with the VPN server 120, the DNS server may return communication information (e.g., domain name, IP address, etc.) associated with the identified host device. To process the data request, the VPN server 120 may open a first communication socket between the VPN server 120 and the identified host device on the open Internet. Further, the VPN server 120 may utilize the assigned exit IP address to transmit a query to the identified host device for the purpose of retrieving the data of interest. Based at least in part on transmitting the query, the VPN server 120 may retrieve the data of interest from the identified host device.

Further, based at least in part on the correlation between the entry IP address and the assigned exit IP address in the connection tracking table, as shown by reference numeral 220, the VPN server 120 may route the retrieved data of interest to the user device 102. In some aspects, the correlation between the entry IP address and the assigned exit IP address may be privately or internally stored within the VPN server 120 in, for example, the connection tracking table. Based at least in part on the retrieving the data of interest, the VPN server 120 may inspect the connection tracking table to determine the routing of the retrieved data of interest. The correlation between the entry IP address and the assigned exit IP address may indicate that the data of interest, retrieved by utilizing the assigned exit IP address, is to be routed to the user device 102, which transmitted the data request to the entry IP address of the VPN server 120.

In another example, when the VPN server 120 determines that the identified host to device is likely to block communication from an exit IP address associated with the VPN server 120, the VPN server 120 may process the data request utilizing a new exit IP address (e.g., second exit IP address), associated with a secondary server. For instance, when the VPN server 120 determines that the identified host to device is likely to block communication from an exit IP address associated with the VPN server 120, the VPN server 120 may determine that communication from the assigned exit IP address is likely to be blocked by the identified host device. In one case, based at least in part on transmitting the query to the identified host device, the VPN server 120 is likely to receive a response from the identified host device indicating that the identified host device declines to provide the data of interest due to the assigned exit IP address being associated with commercial use by the VPN server. In another case, based at least in part on transmitting the query to the identified host device, the VPN server 120 is likely to receive a response from the identified host device indicating that the identified host device has blacklisted the assigned exit IP address such that communications transmitted utilizing the assigned exit IP address are discarded by the identified host device. As a result, the VPN server 120 may determine that communication from the assigned exit IP address is likely to be blocked such that the data of interest may likely not be retrieved from the identified host device by utilizing the assigned exit IP address. In this case, the VPN server 120 may determine and store, in a local memory, a negative correlation between the assigned exit IP address and the identified host device to indicate that the assigned exit IP address is not to be utilized for retrieving information from the identified host device.

Based at least in part on determining that communication from the assigned exit IP address is likely to be blocked by the identified host device, the VPN server 120 may automatically, and in real time, suspend utilization of the assigned exit IP address for retrieving information from the identified host device. Further, the VPN server 120 may determine that the new exit IP address is to be utilized to retrieve the data of interest from the host device. In some aspects, the VPN server 120 may suspend utilization of the assigned exit IP address with respect to only the identified host device. In other words, the VPN server may continue to utilize the assigned exit IP address to retrieve data of interest for the user device 102 (or for another user device) from another host device that is not likely to block communication from an exit IP address associated with the VPN server. In some aspects, the VPN server 120 and/or the VSP control infrastructure may store information regarding suspended utilization of the assigned exit IP address in a memory (e.g., server database 112).

Further, during suspension of utilization of the assigned exit IP address, the VPN server 120 may periodically (e.g., every 30 seconds, every 60 seconds, every 3 minutes, every numeral five minutes, every 10 minutes, every 30 minutes, every 60 minutes, etc.) transmit a query to the identified host device to determine whether the host device has in fact blocked communication from the assigned exit IP address. In an example, when the VPN server 120 receives an expected reply (e.g., data of interest) from the host device in response to a transmitted query, the VPN server 120 may determine that the host device has not blocked communication from the assigned exit IP address. In this case, the VPN server 120 may end suspension of utilization of the assigned exit IP address. In other words, the VPN server 120 may utilize the assigned exit IP address to retrieve data of interest for the user device 102 from the host device. In this case, the VPN server 120 may discard the negative correlation between the assigned exit IP address and the host device. In some aspects, the VPN server 120 may proactively, and prior to receiving a data request from the user device 102, utilize the assigned exit IP address to transmit periodic queries to determine whether the host device has blocked communication from the exit IP address. When the VPN server 120 determines that the host device has blocked communication from the assigned exit IP address, the VPN server 120 may determine that another exit IP address is to be utilized to retrieve data of interest from the host device.

During suspension of utilization of the assigned exit IP address, the VPN server 120 may utilize one or more new exit IP address (e.g., one at a time) to retrieve the data of interest from the identified host device. In some aspects, during the established VPN connection between the VPN server 120 and the user device 102, the VPN server 120 may communicate with a secondary server 118 to establish a connection between the VPN server 120 and the secondary server 118. The secondary server may be from among a plurality of secondary servers available to the VPN server 120. To enable the VPN server 120 to communicate with the secondary server 118, the VSP control infrastructure may configure the VPN server 120 with communication information associated with the secondary server 118. Alternatively, based at least in part on determining that communication from the assigned exit IP address is likely to be blocked, the VPN server 120 may transmit to the VSP control infrastructure a request to receive the communication information associated with the secondary server 118. The VPN server 120 may utilize the communication information to initiate communication with the secondary server 118.

In some aspects, the secondary server 118 may be configured and maintained by the VSP control infrastructure. Further, the VPN server 120 may select the secondary server 118, from among the plurality of secondary servers available to the VPN server 120, to be utilized to retrieve the data of interest from the host device based at least in part on the secondary server 118 being optimal for retrieving the data of interest. In an example, the secondary server 118 may be optimal because the secondary server 118 may be reserved for the purpose of retrieving data of interest by the VPN server 120. In another example, the secondary server 118 may be optimal because the secondary server 118 may be located geographically/physically closer (and therefore able to provide speedier service) to the user device 102 and/or the VPN server 120. In yet another example, the secondary server 118 may be optimal because the secondary server 118 may currently have a highest available bandwidth to retrieve the data of interest. In yet another example, the secondary server 118 may be optimal because the secondary server 118 may be located geographically/physically closer to an international Internet exchange hub (and therefore able to provide speedier service).

In some aspects the connection between the VPN server 120 and the secondary server 118 may include a secure connection (e.g., encrypted tunnel) such that data communicated between the VPN server 120 and the secondary server 118 may be encrypted and/or decrypted based at least in part on utilizing a negotiated cryptographic key. The cryptographic key may be a symmetric key determined based at least in part on combination of a public key associated with the VPN server 120, a public key associated with the secondary server 118, and/or a randomly generated value.

Based at least in part on establishing a connection with the secondary server 118, the VPN server 120 may again process the data request by transmitting, during the established VPN connection between the VPN server 120 and the user device 102, an encrypted message to the secondary server 118 via the secure connection. The encrypted message may include the data request identifying the data of interest to be retrieved and/or the communication information associated with the host device indicating that the data of interest is to be retrieved from the host device. In some aspects, the message may include an unsecure IP packet. In this case, the VPN server 120 may include the communication information in a request line included in the unsecure IP packet. The data request may be included in a payload of the unsecure IP packet. In some aspects, the message may include a secure IP packet. In this case, the VPN server 120 may configure the secure IP packet to include a server name indication (SNI) header, and may include the communication information within the SNI header. The data request may be included in a payload of the secure IP packet.

Based at least in part on receiving the encrypted message, the secondary server 118 may decrypt the encrypted message to determine the IP packet. In some aspects, the secondary server 118 may analyze the payload of the IP packet to determine the data request identifying the data of interest. In some aspects, the secondary server 118 may determine whether the message includes the unsecure IP packet or a secure IP packet. When the secondary server 118 determines that the message includes an unsecure IP packet, the secondary server 118 may analyze the request line to determine the communication information associated with the host device. Alternatively, when the secondary server 118 determines that the message includes a secure IP packet, the secondary server 118 may analyze the SNI header to determine the communication information associated with the host device.

Further, the secondary server 118 may assign one or more (e.g., one at a time) new exit IP addresses (e.g., second exit IP address) for retrieving the data of interest from the identified host device. The new exit IP address may be selected from a pool of exit IP addresses available to the secondary server 118. In some aspects, the secondary server 118 may randomly or sequentially select the new exit IP address from the pool of exit IP addresses, in a similar and/or analogous manner as discussed elsewhere herein.

Based at least in part on determining the data of interest and/or the communication information associated with the identified host device and/or the new exit IP address, the secondary server 118 may utilize the new exit IP address to transmit a query to the identified host device for the purpose of retrieving the data of interest. Because communication from the new exit IP address associated with the secondary server 118 may not likely be blocked by the identified host device, the identified host device may provide the data of interest to the secondary server 118. Based at least in part on receiving the data of interest from the identified host device, the secondary server 118 may transmit the data of interest to the VPN server 120. In some aspects, the secondary server 118 may encrypt the data of interest prior to transmitting the data of interest to the VPN server 120 via the secure connection between the VPN server 120 and the secondary server 118. In some aspects, in association with the data of interest, the secondary server 118 may transmit information identifying the new exit IP address utilized to retrieve the data of interest from the identified host device.

Based at least in part on receiving the information identifying the new exit IP address, the VPN server 120 may add a positive correlation between the new exit IP address and the identified host device to indicate that the new exit IP address, associated with the secondary server 118, may be utilized and/or is available to be utilized to retrieve information (e.g., data of interest, etc.) from the identified host device. Additionally, the VPN server 120 may add a correlation between the new exit IP address associated with the secondary server 118 and the entry IP address utilized by the user device 102 to transmit the data request. In some aspects, the correlation between the entry IP address and the new exit IP address may be privately or internally stored within the VPN server 120 in, for example, the connection tracking table. Based at least in part on the receiving the data of interest, the VPN server 120 may inspect the connection tracking table to determine the routing of the received data of interest. In this case, the correlation between the entry IP address and the new exit IP address may indicate that the data of interest, that was retrieved by utilizing the new exit IP address, is to be routed to the user device 102, which transmitted the data request to the entry IP address of the VPN server 120. Further, based at least in part on a correlation between the entry IP address and the new exit IP address, as shown by reference numeral 220, the VPN server 120 may transmit the received data of interest to the user device 102.

In some aspects, the VPN server 120 may receive a second data request from the user device 102 during the established VPN connection. When the second data request is associated with retrieving data of interest from the identified host device, and utilization of the assigned exit IP address is suspended, the VPN server 120 may again utilize the new exit IP address associated with the secondary server 118 to retrieve the data of interest from the identified host device, as discussed above. Alternatively, when the second data request is associated with retrieving data of interest from another host device, the VPN server 120 may utilize the assigned exit IP address to retrieve the data of interest from the other host device.

In the case where the VPN server 120 utilizes the secondary server 118, the identified host device may block communication from an exit IP address associated with the VPN server 120, the DNS server returns communication information (e.g., domain name come IP address) associated with the VPN server 120 itself. Because the DNS settings are configured to resolve for the VPN server 120 itself, a web application (e.g., web browser, client application, etc.) installed on the user device may receive communication information associated with the VPN server 120 instead of communication information associated with the secondary server 118. The communication information associated with the VPN server 120 may be stored in a cache memory of the user device 102 for a given time period. As such, even when the secondary server 118 becomes unavailable, and the VPN server 120 utilizes another secondary server to retrieve the data of interest from the one or more host devices, the information stored in a cache of the web application is that of the VPN server 120. As a result, the VPN server 120 may be able to forward, in real time (e.g., without having to wait for an expiration of the given time period), data of interest retrieved by the other secondary server to the user device over the established VPN connection, thereby optimizing communication in the VPN.

In this way, a VSP control infrastructure and/or a primary server may enable a user device to receive data of interest without, among other things, maintaining an established VPN connection without being able to receive data of interest, and/or disconnecting the established VPN connection, and/or establishing a new VPN connection with a new VPN server, and/or requesting the data of interest utilizing a new exit IP address associated with the new VPN server. As a result, the VSP control infrastructure and/or the primary server may enable efficient utilization of user device resources (e.g., processing resources, memory resources, power consumption resources, battery life, or the like) and VPN resources (computational resources, network bandwidth, management resources, processing resources, memory resources, or the like) for performing suitable tasks associated with the VPN.

In a situation where communication from the one or more (e.g., one at a time) new exit IP addresses (e.g., one or more second exit IP address) is blocked by the identified host device, the secondary server 118 may suspend utilization of the new exit IP address in a similar and/or analogous manner as discussed elsewhere herein. Further, the secondary server 118 may select and utilize another exit IP address (e.g., third exit IP address), from among the pool of exit IP addresses available to the secondary server 118, to transmit a query to retrieve the data of interest from the identified host device. The secondary server 118 may also periodically query the identified host device to determine whether the identified host device has ceased to block communication from one or more exit IP addresses (e.g., second exit IP address, etc.) associated with the secondary server 118, in a similar and/or analogous manner as discussed elsewhere herein.

In a situation where communication from all exit IP addresses associated with the secondary server 118 may be blocked by the identified host device, the VPN server 120 may utilize another secondary server to retrieve the data of interest from the identified host device in a similar and/or analogous manner as discussed above.

In some aspects, the VPN server 120 may determine and store, in the local memory, positive correlations between the identified host device and an exit IP address (e.g., first exit IP address, second exit IP address, etc.) known to successfully retrieve the data of interest from the identified host device. Similarly, the VPN server 120 may determine and store, in the local memory, negative correlations between the identified host device and an exit IP address known to be blocked by the identified host device. Further, the VPN server 120 may transmit a report message to the VSP control infrastructure indicating the positive correlations and the negative correlations. The report may be stored in a memory associated with the VSP control infrastructure. In turn, the VSP control infrastructure may report the positive correlations and the negative correlations to one or more VPN servers associated with the VSP control infrastructure. In some aspects, the VPN server 120 may transmit the report message directly to the one or more VPN servers associated with the VSP control infrastructure. Based at least in part on receiving the report message, the one or more VPN servers may update respective positive correlations and negative correlations associated with retrieving data of interest from host devices believed to block communication from exit IP addresses assigned for commercial use by a commercial entity. In one example, the one or more VPN servers may add a positive correlation indicating that the new exit IP address (e.g., second exit IP address) associated with the secondary server 118 may be utilized to retrieve data of interest from the identified host device. In another example, the one or more VPN servers may add a negative correlation indicating that the assigned exit IP address (e.g., first exit IP address) associated with the VPN server 120 may not be utilized to retrieve data of interest from the identified host device.

As indicated above, FIG. 2 is provided as an example. Other examples may differ from what is described with regard to FIG. 2.

FIG. 3 is an illustration of an example process 300 associated with optimizing communication in a VPN during blocking of an exit IP address, according to various aspects of the present disclosure. In some aspects, the process 300 may be performed by an associated memory (e.g., memory 730) and/or an associated processor (e.g., processor 720) related to a VPN server (e.g., VPN server 120) configured by an associated VSP control infrastructure. As shown by reference numeral 310, process 300 includes assigning, by a VPN server based at least in part on establishing a VPN connection with the user device, a first exit internet protocol (IP) address to be utilized for retrieving information requested by the user device during the VPN connection. For instance, the VPN server may utilize the associated memory and/or processor to assign, based at least in part on establishing a VPN connection with the user device, a first exit internet protocol (IP) address to be utilized for retrieving information requested by the user device during the VPN connection, as discussed elsewhere herein.

As shown by reference numeral 320, process 300 includes determining, by the VPN server during the established VPN connection, a host device that is likely to block communication from the first exit IP address (e.g., block the VPN server from utilizing the first exit IP address to communicate with the host device). For instance, the VPN server may utilize the associated memory and/or processor to determine, during the established VPN connection, a host device that is likely to block communication from the first exit IP address, as discussed elsewhere herein.

As shown by reference numeral 330, process 300 includes modifying, by the VPN server based at least in part on determining the host device, associated domain name system (DNS) settings to return communication information associated with the VPN server itself when the information is to be retrieved from the host device. For instance, the VPN server may utilize the associated memory and/or processor to modify, based at least in part on determining the host device, associated domain name system (DNS) settings to return communication information associated with the VPN server itself when the information is to be retrieved from the host device, as discussed elsewhere herein.

As shown by reference numeral 340, process 300 includes receiving, by the VPN server during the established VPN connection, the information retrieved from the host device based at least in part on utilizing a second exit IP address associated with a secondary server. For instance, the VPN server may utilize an associated communication interface (e.g., communication interface 770) along with the associated memory and/or the processor to receive, during the established VPN connection, the information retrieved from the host device based at least in part on utilizing a second exit IP address associated with a secondary server, as discussed elsewhere herein.

As shown by reference numeral 350, process 300 includes transmitting, by the VPN server during the established VPN connection, the information to the user device in accordance with the modified DNS settings. For instance, the VPN server may utilize the associated communication interface, memory, and/or processor to transmit, during the established VPN connection, the information to the user device in accordance with the modified DNS settings, as discussed elsewhere herein.

Process 300 may include additional aspects, such as any single aspect or any combination of aspects described below and/or in connection with one or more other processes described elsewhere herein.

In a first aspect, in process 300, assigning the first exit IP address includes selecting the first exit IP address from among a pool of exit IP addresses available to the VPN server.

In a second aspect, alone or in combination with the first aspect, in process 300, modifying the associated DNS settings includes modifying a configuration file of an associated DNS server to return the communication information associated with the VPN server instead of communication information associated with the secondary server when the information is to be retrieved from the host device.

In a third aspect, alone or in combination with the first through second aspects, process 300 may include receiving, by the VPN server during the established VPN connection, a data request from the user device to retrieve the information from the host device.

In a fourth aspect, alone or in combination with the first through third aspects, process 300 may include establishing, by the VPN server, a secure connection between the VPN server and the secondary server to enable utilization of the second exit IP address for retrieving the information from the host device.

In a fifth aspect, alone or in combination with the first through fourth aspects, process 300 may include receiving, by the VPN server during the established VPN connection, a data request for retrieving other information from another host device; and utilizing, by the VPN server during the established VPN connection, the first exit IP address to retrieve the other information from the other host device.

In a sixth aspect, alone or in combination with the first through fifth aspects, process 300 may include storing, by the VPN server in an associated memory, a positive correlation between the second exit IP address and the host device to indicate that the second exit IP address is available to retrieve data from the host device and a negative correlation between the first exit IP address and the host device to indicate that the first exit IP address is unavailable to retrieve data from the host device.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with optimizing communication in a VPN during blocking of an exit IP address, according to various aspects of the present disclosure. In some aspects, the process 400 may be performed by an associated memory (e.g., memory 730) and/or an associated processor (e.g., processor 720) related to a VPN server (e.g., VPN server 120) configured by an associated VSP control infrastructure. As shown by reference numeral 410, process 400 may include receiving, by a VPN server from a user device during an established VPN connection between the VPN server and the user device, a first data request for the VPN server to retrieve first information from a first host device. For instance, the VPN server may utilize an associated communication interface (e.g., communication interface 770) with the associated memory and/or processor to receive, from a user device during an established VPN connection between the VPN server and the user device, a first data request for the VPN server to retrieve first information from a first host device, as discussed elsewhere herein.

As shown by reference numeral 420, process 400 includes transmitting, by the VPN server during the established VPN connection, the first information to the user device based at least in part on utilizing a first exit IP address to retrieve the first information from the first host device. For instance, the VPN server may utilize the associated communication interface, memory, and processor to transmit, during the established VPN connection, the first information to the user device based at least in part on utilizing a first exit IP address to retrieve the first information from the first host device, as discussed elsewhere herein.

As shown by reference numeral 430, process 400 includes receiving, by the VPN server from the user device during the established VPN connection, a second data request for the VPN server to retrieve second information from a second host device. For instance, the VPN server may utilize the associated memory and processor to receive, from the user device during the established VPN connection, a second data request for the VPN server to retrieve second information from a second host device, as discussed elsewhere herein.

As shown by reference numeral 440, process 400 includes transmitting, by the VPN server during the established VPN connection, the second information to the user device based at least in part on utilizing a second exit IP address, associated with a secondary server, to retrieve the second information from the second host device. For instance, the VPN server may utilize the associated communication interface, memory, and processor to transmit, during the established VPN connection, the second information to the user device based at least in part on utilizing a second exit IP address, associated with a secondary server, to retrieve the second information from the second host device, as discussed elsewhere herein.

Process 400 may include additional aspects, such as any single aspect or any combination of aspects described below and/or in connection with one or more other processes described elsewhere herein.

In a first aspect, wherein, process 400 may include utilizing, by the VPN server, the first exit IP address to retrieve the first information based at least in part on determining that the first host device is likely to allow communication from the first exit IP address.

In a second aspect, alone or in combination with the first aspect, process 400 may include determining, by the VPN server, that the first host device is likely to allow communication from the first exit IP address based at least in part on determining that communication information associated with the first host device fails to match communication information associated with one or more host devices that are likely to block communication from the first exit IP address (e.g., the VPN server from utilizing the first exit IP address to communicate with the one or more host devices).

In a third aspect, alone or in combination with the first through second aspects, process 400 may include utilizing, by the VPN server, the second exit IP address to retrieve the second information based at least in part on determining that the second host device is likely to block communication from the first exit IP address.

In a fourth aspect, alone or in combination with the first through third aspects, process 400 may include determining, by the VPN server, that the second host device is likely to block communication from the first exit IP address based at least in part on determining that communication information associated with the second host device matches communication information associated with one or more host devices that are likely to block communication from the first exit IP address.

In a fifth aspect, alone or in combination with the first through fourth aspects, process 400 includes modifying, by the VPN server, associated domain name system (DNS) settings to return communication information associated with the VPN server when information is to be retrieved from one or more host devices that are likely to block communication from the first exit IP address.

In a sixth aspect, alone or in combination with the first through fifth aspects, in process 400, transmitting the second information includes transmitting the second information in accordance with modified domain name system (DNS) settings that are modified to return communication information associated with the VPN server when data is to be retrieved from the second host device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with optimizing communication in a VPN during blocking of an exit IP address, according to various aspects of the present disclosure. In some aspects, the process 500 may be performed by an associated memory (e.g., memory 730) and/or an associated processor (e.g., processing unit 110, processor 720) related to a VSP control infrastructure configured to configure an associated VPN server (e.g., VPN server 120). As shown by reference numeral 510, process 500 includes configuring a VPN server to assign, based at least in part on establishing a VPN connection with the user device, a first exit internet protocol (IP) address to be utilized for retrieving information requested by the user device during the VPN connection. For instance, the VSP control infrastructure may utilize the associated memory and/or processor to configure a VPN server to assign, based at least in part on establishing a VPN connection with the user device, a first exit internet protocol (IP) address to be utilized for retrieving information requested by the user device during the VPN connection, as discussed elsewhere herein.

As shown by reference numeral 520, process 500 includes configuring the VPN server to determine, during the established VPN connection, a host device that is likely to block communication from the first exit IP address (e.g., block the VPN server from utilizing the first exit IP address to communicate with the host device). For instance, the VSP control infrastructure may utilize the associated memory and/or processor to configure the VPN server to determine, during the established VPN connection, a host device that is likely to block communication from the first exit IP address, as discussed elsewhere herein.

As shown by reference numeral 530, process 500 includes configuring the VPN server to modify, based at least in part on determining the host device, associated domain name system (DNS) settings to return communication information associated with the VPN server itself when the information is to be retrieved from the host device. For instance, the VSP control infrastructure may utilize the associated memory and/or processor to configure the VPN server to modify, based at least in part on determining the host device, associated domain name system (DNS) settings to return communication information associated with the VPN server itself when the information is to be retrieved from the host device, as discussed elsewhere herein.

As shown by reference numeral 540, process 500 includes configuring the VPN server to receive, during the established VPN connection, the information retrieved from the host device based at least in part on utilizing a second exit IP address associated with a secondary server. For instance, the VSP control infrastructure may utilize the associated memory and/or processor to configure the VPN server to receive, during the established VPN connection, the information retrieved from the host device based at least in part on utilizing a second exit IP address associated with a secondary server, as discussed elsewhere herein.

As shown by reference numeral 550, process 500 includes configuring the VPN server to transmit, during the established VPN connection, the information to the user device in accordance with the modified DNS settings. For instance, the VSP control infrastructure may utilize the associated memory and/or processor to configure the VPN server to transmit, during the established VPN connection, the information to the user device in accordance with the modified DNS settings, as discussed elsewhere herein Process 500 may include additional aspects, such as any single aspect or any combination of aspects described below and/or in connection with one or more other processes described elsewhere herein.

In a first aspect, wherein, in process 500, configuring the VPN server to assign the first exit IP address includes configuring the VPN server to select the first exit IP address from among a pool of exit IP addresses available to the VPN server.

In a second aspect, alone or in combination with the first aspect, in process 500, configuring the VPN server to modify the associated DNS settings includes configuring the VPN server to modify a configuration file of an associated DNS server to return the communication information associated with the VPN server instead of communication information associated with the secondary server when the information is to be retrieved from the host device.

In a third aspect, alone or in combination with the first through second aspects, process 500 may include configuring the VPN server to receive, during the established VPN connection, a data request from the user device to retrieve the information from the host device.

In a fourth aspect, alone or in combination with the first through third aspects, process 500 may include configuring the VPN server to establish a secure connection between the VPN server and the secondary server to enable utilization of the second exit IP address for retrieving the information from the host device.

In a fifth aspect, alone or in combination with the first through fourth aspects, process 500 may include configuring the VPN server to receive, during the established VPN connection, a data request for retrieving other information from another host device; and configuring the VPN server to utilize, during the established VPN connection, the first exit IP address to retrieve the other information from the other host device.

In a sixth aspect, alone or in combination with the first through fifth aspects, process 500 may include configuring the VPN server to store, in an associated memory, a positive correlation between the second exit IP address and the host device to indicate that the second exit IP address is available to retrieve data from the host device and a negative correlation between the first exit IP address and the host device to indicate that the first exit IP address is unavailable to retrieve data from the host device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with optimizing communication in a VPN during blocking of an exit IP address, according to various aspects of the present disclosure. In some aspects, the process 600 may be performed by an associated memory (e.g., memory 730) and/or an associated processor (e.g., processing unit 110, processor 720) related to a VSP control infrastructure configured to configure an associated VPN server (e.g., VPN server 120). As shown by reference numeral 610, process 600 includes configuring a VPN server to receive, from a user device during an established VPN connection between the VPN server and the user device, a first data request for the VPN server to retrieve first information from a first host device. For instance, the VSP control infrastructure may utilize the associated memory and/or processor to configure a VPN server to receive, from a user device during an established VPN connection between the VPN server and the user device, a first data request for the VPN server to retrieve first information from a first host device, as discussed elsewhere herein.

As shown by reference numeral 620, process 600 includes configuring the VPN server to transmit, during the established VPN connection, the first information to the user device based at least in part on utilizing a first exit IP address to retrieve the first information from the first host device. For instance, the VSP control infrastructure may utilize the associated memory and/or processor to configure the VPN server to transmit, during the established VPN connection, the first information to the user device based at least in part on utilizing a first exit IP address to retrieve the first information from the first host device, as discussed elsewhere herein.

As shown by reference numeral 630, process 600 includes configuring the VPN server to receive, from the user device during the established VPN connection, a second data request for the VPN server to retrieve second information from a second host device. For instance, the VSP control infrastructure may utilize the associated memory and/or processor to configure the VPN server to receive, from the user device during the established VPN connection, a second data request for the VPN server to retrieve second information from a second host device, as discussed elsewhere herein.

As shown by reference numeral 640, process 600 includes configuring the VPN server to transmit, during the established VPN connection, the second information to the user device based at least in part on utilizing a second exit IP address, associated with a secondary server, to retrieve the second information from the second host device. For instance, the VSP control infrastructure may utilize the associated memory and/or processor to configure the VPN server to transmit, during the established VPN connection, the second information to the user device based at least in part on utilizing a second exit IP address, associated with a secondary server, to retrieve the second information from the second host device, as discussed elsewhere herein.

Process 600 may include additional aspects, such as any single aspect or any combination of aspects described below and/or in connection with one or more other processes described elsewhere herein.

In a first aspect, wherein, process 600 may include modify associated domain name system (DNS) settings to return communication information associated with the VPN server when information is to be retrieved from one or more host devices that are likely to block communication from the first exit IP address.

In a second aspect, alone or in combination with the first aspect, process 600 may include configuring the VPN server to determine that the first host device is likely to allow communication from the first exit IP address based at least in part on determining that communication information associated with the first host device fails to match communication information associated with one or more host devices that are likely to block communication from the first exit IP address.

In a third aspect, alone or in combination with the first through second aspects, process 600 may include configuring the VPN server to utilize the second exit IP address to retrieve the second information based at least in part on determining that the second host device is likely to block communication from the first exit IP address.

In a fourth aspect, alone or in combination with the first through third aspects, process 600 may include configuring the VPN server to determine that the second host device is likely to block communication from the first exit IP address based at least in part on determining that communication information associated with the second host device matches communication information associated with one or more host devices that are likely to block communication from the first exit IP address.

In a fifth aspect, alone or in combination with the first through fourth aspects, process 600 may include configuring the VPN server to modify associated domain name system (DNS) settings to return communication information associated with the VPN server when information is to be retrieved from one or more host devices that are likely to block communication from the first exit IP address.

In a sixth aspect, alone or in combination with the first through fifth aspects, in process 600, configuring the VPN server to transmit the second information includes configuring the VPN server to transmit the second information in accordance with modified domain name system (DNS) settings that are modified to return communication information associated with the VPN server when data is to be retrieved from the second host device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, environments, infrastructures, components, devices or the like described elsewhere herein (e.g., VPN server, the VSP control infrastructure, etc.) and may be utilized for performing the example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A virtual private network (VPN) infrastructure device, comprising:

a memory; and a processor communicatively coupled to the memory, the memory and the processor being configured to:

configure a VPN server to assign, based at least in part on establishing a VPN connection with a user device, a first exit internet protocol (IP) address to be utilized for retrieving information requested by the user device during the VPN connection;

configure the VPN server to determine, during the established VPN connection, a host device that is to block communication from the first exit IP address;

configure the VPN server to modify, based at least in part on determining that the host device is to block the communication from the first exit IP address, associated domain name system (DNS) settings of a DNS server associated with the VPN server to return communication information associated with the VPN server itself when the information is to be retrieved from the host device;

configure the VPN server to receive, during the established VPN connection, the information retrieved from the host device based at least in part on utilizing a second exit IP address associated with a secondary server; and configure the VPN server to transmit, during the established VPN connection, the information to the user device in accordance with the modified DNS settings.

2. The VPN infrastructure device of claim 1, wherein, to configure the VPN server to assign the first exit IP address, the memory and the processor are configured to configure the VPN server to select the first exit IP address from among a pool of exit IP addresses available to the VPN server.

3. The VPN infrastructure device of claim 1, wherein, to configure the VPN server to modify the associated DNS settings, the memory and the processor are configured to configure the VPN server to modify a configuration file of the DNS server to return the communication information associated with the VPN server instead of communication information associated with the secondary server when the information is to be retrieved from the host device.

4. The VPN infrastructure device of claim 1, wherein the memory and the processor are configured to:

configure the VPN server to receive, during the established VPN connection, a data request from the user device to retrieve the information from the host device.

5. The VPN infrastructure device of claim 1, wherein the memory and the processor are configured to:

configure the VPN server to establish a secure connection between the VPN server and the secondary server to enable utilization of the second exit IP address for retrieving the information from the host device.

6. The VPN infrastructure device of claim 1, wherein the memory and the processor are configured to:

configure the VPN server to receive, during the established VPN connection, a data request for retrieving other information from another host device; and configure the VPN server to utilize, during the established VPN connection, the first exit IP address to retrieve the other information from the other host device.

7. The VPN infrastructure device of claim 1, wherein the memory and the processor are configured to:

configure the VPN server to store, in an associated memory, a positive correlation between the second exit IP address and the host device to indicate that the second exit IP address is available to retrieve data from the host device and a negative correlation between the first exit IP address and the host device to indicate that the first exit IP address is unavailable to retrieve data from the host device.

8. A method in a virtual private network (VPN), the method comprising:

configuring a VPN server to assign, based at least in part on establishing a VPN connection with a user device, a first exit internet protocol (IP) address to be utilized for retrieving information requested by the user device during the VPN connection;

configuring the VPN server to determine, during the established VPN connection, a host device that is to block communication from the first exit IP address;

configuring the VPN server to modify, based at least in part on determining that the host device is to block the communication from the first exit IP address, associated domain name system (DNS) settings of a DNS server associated with the VPN server to return communication information associated with the VPN server itself when the information is to be retrieved from the host device;

configuring the VPN server to receive, during the established VPN connection, the information retrieved from the host device based at least in part on utilizing a second exit IP address associated with a secondary server; and configuring the VPN server to transmit, during the established VPN connection, the information to the user device in accordance with the modified DNS settings.

9. The method of claim 8, wherein configuring the VPN server to assign the first exit IP address includes configuring the VPN server to select the first exit IP address from among a pool of exit IP addresses available to the VPN server.

10. The method of claim 8, wherein configuring the VPN server to modify the associated DNS settings includes configuring the VPN server to modify a configuration file of the DNS server to return the communication information associated with the VPN server instead of communication information associated with the secondary server when the information is to be retrieved from the host device.

11. The method of claim 8, further comprising:

configuring the VPN server to receive, during the established VPN connection, a data request from the user device to retrieve the information from the host device.

12. The method of claim 8, further comprising:

configuring the VPN server to establish a secure connection between the VPN server and the secondary server to enable utilization of the second exit IP address for retrieving the information from the host device.

13. The method of claim 8, further comprising:

configuring the VPN server to receive, during the established VPN connection, a data request for retrieving other information from another host device; and configuring the VPN server to utilize, during the established VPN connection, the first exit IP address to retrieve the other information from the other host device.

14. The method of claim 8, further comprising:

configuring the VPN server to store, in an associated memory, a positive correlation between the second exit IP address and the host device to indicate that the second exit IP address is available to retrieve data from the host device and a negative correlation between the first exit IP address and the host device to indicate that the first exit IP address is unavailable to retrieve data from the host device.

15. A non-transitory computer-readable medium configured to store instructions, which when executed by a processor associated with a virtual private network (VPN) infrastructure device, configure the processor to:

configure a VPN server to assign, based at least in part on establishing a VPN connection with a user device, a first exit internet protocol (IP) address to be utilized for retrieving information requested by the user device during the VPN connection;

configure the VPN server to determine, during the established VPN connection, a host device that is to block communication from the first exit IP address;

configure the VPN server to modify, based at least in part on determining that the host device is to block the communication from the first exit IP address, associated domain name system (DNS) settings of a DNS server associated with the VPN server to return communication information associated with the VPN server itself when the information is to be retrieved from the host device;

configure the VPN server to receive, during the established VPN connection, the information retrieved from the host device based at least in part on utilizing a second exit IP address associated with a secondary server; and configure the VPN server to transmit, during the established VPN connection, the information to the user device in accordance with the modified DNS settings.

16. The non-transitory computer-readable medium of claim 15, wherein, to configure the VPN server to assign the first exit IP address, the processor is configured to configure the VPN server to select the first exit IP address from among a pool of exit IP addresses available to the VPN server.

17. The non-transitory computer-readable medium of claim 15, wherein, to configure the VPN server to modify the associated DNS settings, the processor is configured to configure the VPN server to modify a configuration file of the DNS server to return the communication information associated with the VPN server instead of communication information associated with the secondary server when the information is to be retrieved from the host device.

18. The non-transitory computer-readable medium of claim 15, wherein the processor is configured to:

configure the VPN server to receive, during the established VPN connection, a data request from the user device to retrieve the information from the host device.

19. The non-transitory computer-readable medium of claim 15, wherein the processor is configured to:

configure the VPN server to establish a secure connection between the VPN server and the secondary server to enable utilization of the second exit IP address for retrieving the information from the host device.

20. The non-transitory computer-readable medium of claim 15, wherein the processor is configured to:

configure the VPN server to receive, during the established VPN connection, a data request for retrieving other information from another host device; and configure the VPN server to utilize, during the established VPN connection, the first exit IP address to retrieve the other information from the other host device.

* * * * *